United States Patent
Seo et al.

(10) Patent No.: US 9,285,638 B2
(45) Date of Patent: Mar. 15, 2016

(54) LIQUID CRYSTAL DISPLAY

(71) Applicant: Samsung Display Co., Ltd., Yongin (KR)

(72) Inventors: Dong Il Seo, Yongin-si (KR); Bo Sung Kim, Seoul (KR); Kye Hun Lee, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/313,470

(22) Filed: Jun. 24, 2014

(65) Prior Publication Data

US 2015/0036090 A1 Feb. 5, 2015

(30) Foreign Application Priority Data

Aug. 2, 2013 (KR) .................. 10-2013-0092160

(51) Int. Cl.
*G02F 1/1343* (2006.01)
*G02F 1/1362* (2006.01)

(52) U.S. Cl.
CPC .... *G02F 1/134309* (2013.01); *G02F 1/134363* (2013.01); *G02F 1/136213* (2013.01); *G02F 2001/134372* (2013.01); *G02F 2001/136222* (2013.01)

(58) Field of Classification Search
CPC ................................. G02F 1/134363
USPC ............................. 349/141, 38, 39
See application file for complete search history.

(56) References Cited

U.S. PATENT DOCUMENTS

| | | | |
|---|---|---|---|
| 6,356,330 B1 | 3/2002 | Ando et al. | |
| 6,388,725 B2 | 5/2002 | Ohta et al. | |
| 6,462,799 B2 | 10/2002 | Ohta et al. | |
| 7,084,948 B2 | 8/2006 | Nakayoshi et al. | |
| 8,264,653 B2 | 9/2012 | Oh et al. | |
| 8,319,903 B2 | 11/2012 | Oh et al. | |
| 2002/0063835 A1* | 5/2002 | Kim | 349/141 |
| 2004/0021813 A1* | 2/2004 | Kim et al. | 349/113 |

FOREIGN PATENT DOCUMENTS

| | | |
|---|---|---|
| JP | 3394433 B2 | 1/2003 |
| KR | 10-2012-0058231 A | 6/2012 |
| KR | 10-1205766 B1 | 11/2012 |
| KR | 10-2013-0014754 A | 2/2013 |

* cited by examiner

*Primary Examiner* — Thanh-Nhan P Nguyen
(74) *Attorney, Agent, or Firm* — H.C. Park & Associates, PLC (57) ABSTRACT

A liquid crystal display comprising: a substrate; a plurality of common voltage lines disposed on the substrate; an insulating layer disposed on the common voltage lines; and a common electrode and a plurality of pixel electrodes disposed on the insulating layer, the plurality of pixel electrodes constituting a plurality of pixel electrodes, respectively, wherein the insulating layer comprises a plurality of contact holes to expose at least part of the common voltage lines, and wherein two adjacent contact holes among the plurality of contact holes are spaced apart by at least one pixel therebetween.

10 Claims, 9 Drawing Sheets

LIQUID CRYSTAL DISPLAY

CROSS-REFERENCE TO RELATED APPLICATION

This application claims priority from and the benefit of Korean Patent Application No. 10-2013-0092160, filed on Aug. 2, 2013, which is hereby incorporated herein by reference.

BACKGROUND

1. Field

The present invention relates to a liquid crystal display.

2. Discussion of the Background

A liquid crystal display is one of the most widely-used flat panel displays. A liquid crystal display typically includes two substrate panels and a liquid crystal layer disposed therebetween. Each of the substrate panels typically includes field generating electrodes such as a pixel electrode and a common electrode. Voltages are applied to the field generating electrodes to generate an electric field in the liquid crystal layer, which determines the orientation of liquid crystal molecules of the liquid crystal layer and controls the polarization of incident light, thereby displaying an image. The transmittance of the liquid crystal display can be improved as the liquid crystal molecules are better controlled.

In a liquid crystal display, the pixel electrode and the common electrode for generating an electric field in the liquid crystal layer may be provided in one display panel having a switching element formed therein. A liquid crystal display of this type has a contact hole for connecting a common electrode and a common voltage line for transmitting a common voltage, in order to prevent signal delays of the common voltage applied to the common electrode. Those contact holes, however, may reduce the aperture ratio of the liquid crystal display.

The above information disclosed in this Background section is provided only for a better understanding of the background of the invention, and therefore it may contain information that does not constitute the prior art that is already known to a person of ordinary skill in the art.

SUMMARY

Various exemplary embodiments of the present invention provide a liquid crystal display for preventing the reduction in the aperture ratio of a liquid crystal display and reducing a signal delay in the common electrode.

One exemplary embodiment of the present invention provides a liquid crystal display comprising: a substrate; a plurality of common voltage lines disposed on the substrate; an insulating layer disposed on the common voltage lines; and a common electrode and a plurality of pixel electrodes disposed on the insulating layer, the plurality of pixel electrodes constituting a plurality of pixels, respectively, wherein the insulating layer comprises a plurality of contact holes to expose at least part of the common voltage lines, and wherein two adjacent contact holes among the plurality of contact holes are spaced apart by at least one pixel therebetween.

One exemplary embodiment of the present invention provides a liquid crystal display comprising: a first substrate; a second substrate facing the first substrate; a liquid crystal layer interposed between the first substrate and the second substrate and comprising liquid crystal molecules; a plurality of gate lines, a plurality data lines, and a plurality of common voltage lines disposed on the first substrate; an insulating layer disposed on the plurality of common voltage lines; a common electrode disposed on the insulating layer; a plurality of pixels formed on the first substrate and connected to the plurality of gate lines and the plurality of data lines, each pixel comprising: a thin film transistor connected to a first gate line and a first data line; and a pixel electrode connected to the thin film transistor; a plurality of contact holes formed through the insulating layer and to connect the common electrode to one of the common voltage lines, two adjacent contact holes being formed apart by at least one pixel comprising no contact hole therein for connecting the common electrode to the common voltage lines.

According to one exemplary embodiment of the present invention, it can be achieved to prevent the reduction in the aperture ratio of the liquid crystal display and reduce the signal delay with the common voltage line.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
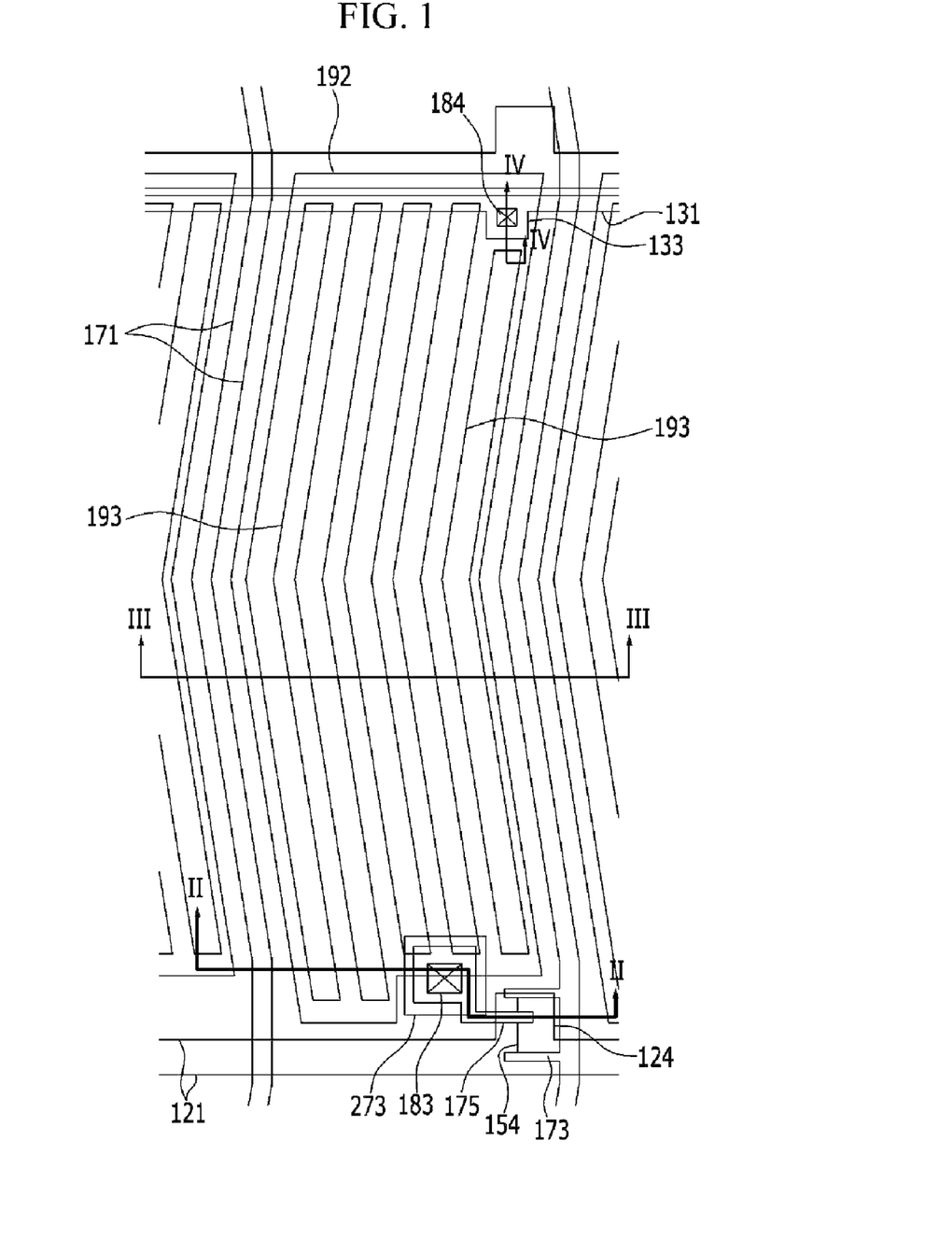
FIG. 1 is a layout view of a liquid crystal display according to one exemplary embodiment of the present invention.
Figure 2:
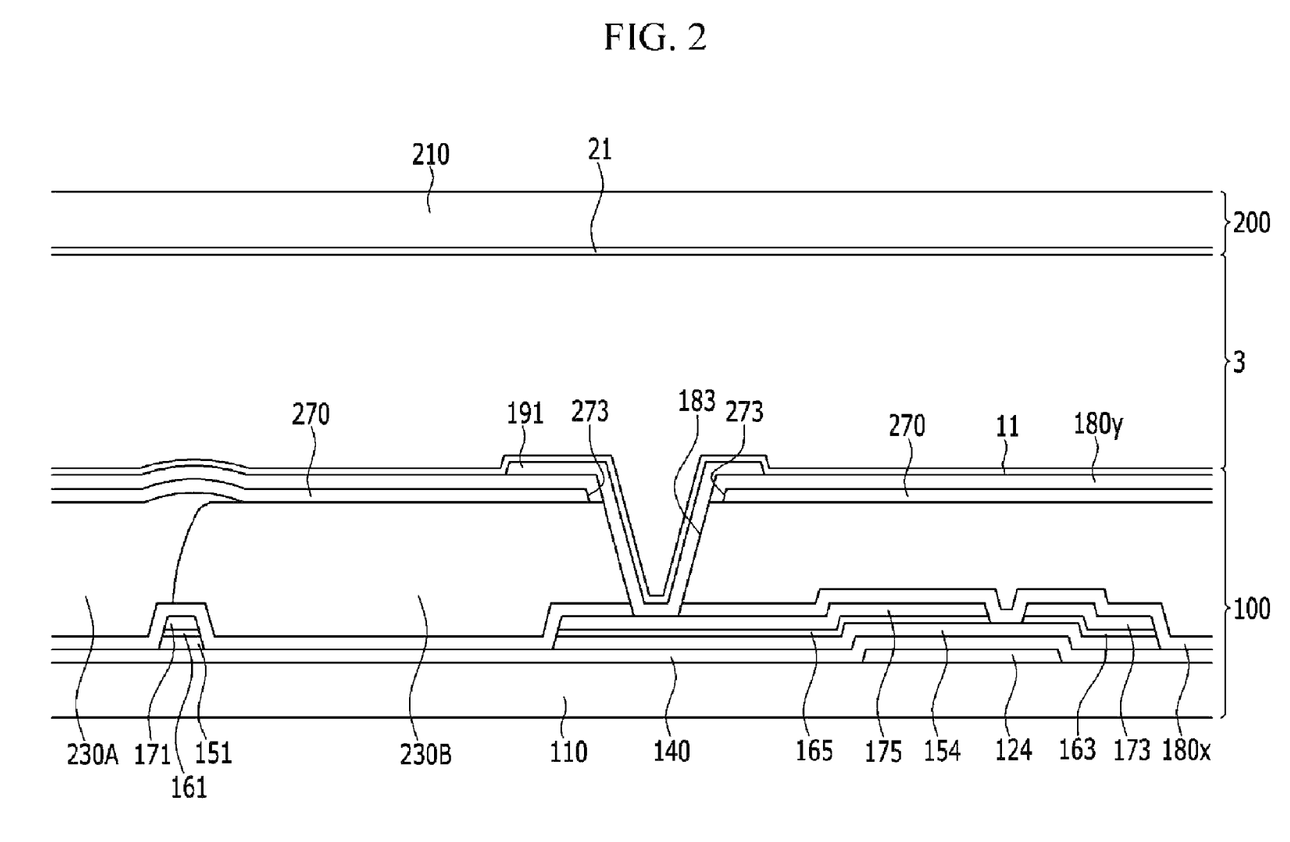
FIG. 2 is a cross-sectional view of the liquid crystal display, taken along line II-II of FIG. 1.
Figure 3:
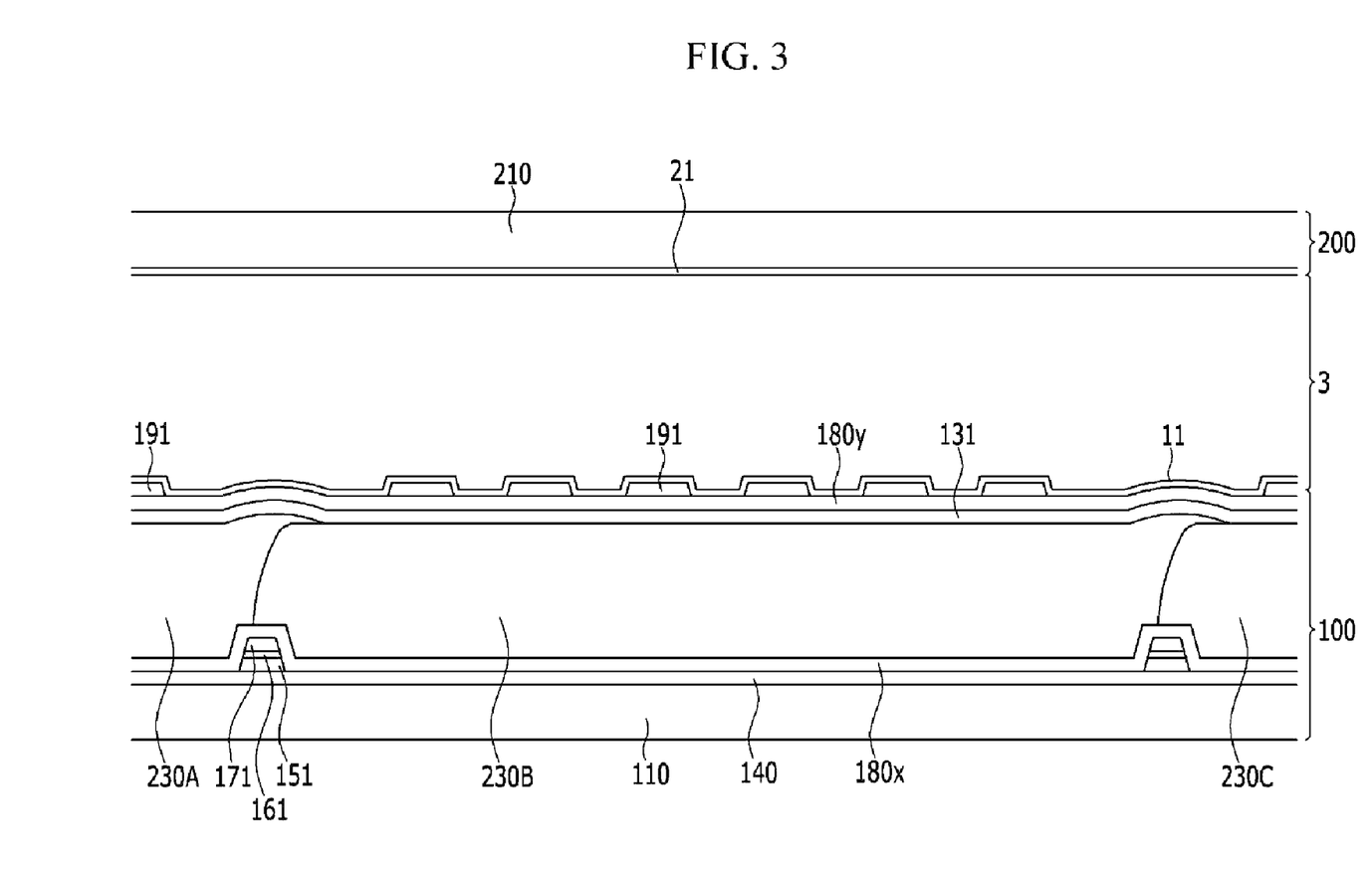
FIG. 3 is a cross-sectional view of the liquid crystal display, taken along line III-III of FIG. 1.
Figure 4:
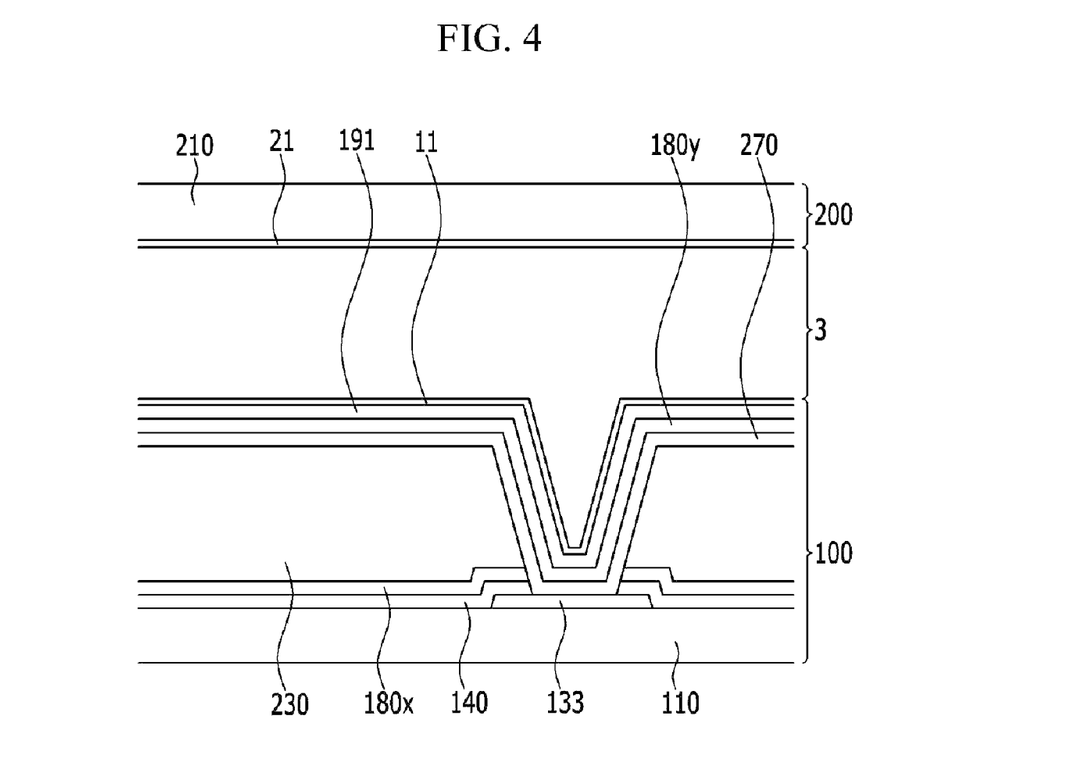
FIG. 4 is a cross-sectional view of the liquid crystal display, taken along line IV-IV of FIG. 1.

Referring to FIGS. 1 to 4, a liquid crystal display according to one exemplary embodiment of the present invention will be described. FIG. 1 is a layout view of a liquid crystal display according to one embodiment of the present invention. FIG. 2 is a cross-sectional view of the liquid crystal display, taken along line II-II of FIG. 1. FIG. 3 is a cross-sectional view of the liquid crystal display, taken along line III-III of FIG. 1. FIG. 4 is a cross-sectional view of the liquid crystal display, taken along line IV-IV of FIG. 1.

Referring to FIGS. 1 to 4, the liquid crystal display according to the exemplary embodiment of the present invention includes lower and upper panels (e.g., substrate panels) 100 and 200 facing each other and a liquid crystal layer 3 positioned between the two panels 100 and 200.

First, the lower panel 100 will be described.

In accordance with one exemplary embodiment, a plurality of gate lines 121 and a common voltage line 131 are formed over an insulation substrate 110.

The gate lines 121 transfer gate signals and may mainly extend in the horizontal direction (i.e., the width direction of the display panel). Each of the gate lines 121 may be connected to or integrally formed with a plurality of gate electrodes 124.

The common voltage line 131 may extend in parallel to the gate line 121, and may include an extension 133.

In accordance with one exemplary embodiment, a gate insulating layer 140 is formed over the gate line 121 and the common voltage line 131. The gate insulating layer 140 may be made, for example, of an inorganic insulator such as silicon nitride (SiNx) or silicon oxide (SiOx).

In accordance with one exemplary embodiment, a plurality of semiconductors 151 may be formed over the gate insulating layer 140. Each of the semiconductors 151 may include a protrusion 154 extending along the gate electrode 124. However, in a liquid crystal display according to another exemplary embodiment of the present invention, the semiconductor 151 may be disposed only over the gate electrode 124. The semiconductor 151 may include an oxide semiconductor.

Further, a plurality of ohmic contacts 161, 163 and 165 may be formed over the semiconductors 151. The ohmic contacts 163 and 165 are disposed over the semiconductor 154 while forming a pair to face each other around the gate electrode 124. The ohmic contacts 161, 163 and 165 may be made, for example, of a material such as n+ hydrogenated amorphous silicon which is highly doped with n-type impurity, or made of silicide. However, when the semiconductor 151 includes an oxide semiconductor, the ohmic contacts 161, 163, and 165 may be omitted.

In accordance with one exemplary embodiment, data conductors including a plurality of data lines 171 and a plurality of drain electrodes 175 may be formed over the ohmic contacts 161, 163 and 165.

In accordance with one exemplary embodiment, the data lines 171 transfer data signals and mainly extend in a vertical direction so as to cross the gate lines 121. Each of the data lines 171 may be connected to or integrally formed with a plurality of source electrodes 173 extending toward the gate electrodes 124. The data lines 171 may periodically be bent and form an oblique angle with the extension direction of the gate lines 121. The oblique angle between the data lines 171 and the extension direction of the gate lines 121 may be set to 45 degrees or more. However, in a liquid crystal display according to another exemplary embodiment of the present invention, the data lines 171 may be extended in other shape, for example, in a straight line.

Each of the drain electrodes 175 may include, around the gate electrode 124, a bar-shaped end portion facing the source electrode 173 and the other end portion having a larger area.

In accordance with one exemplary embodiment, the gate electrode 124, the source electrode 173, the drain electrode 175, and the semiconductor protrusion 154 form a thin film transistor TFT serving as a switching element. The linear semiconductor 151 may have almost the same plane shape as the data line 171, the drain electrode 175, and the ohmic contacts 161, 163, and 165, except the semiconductor protrusion 154 of the thin film transistor.

In accordance with one exemplary embodiment, a first passivation layer 180x may be positioned over the data conductors 171, 173, and 175 and the exposed semiconductor protrusion 154, and may be made of an organic insulating material or inorganic insulating material.

Further, a plurality of color filters 230A, 230B, and 230C may be formed over the first passivation layer 180x. Each of the color filters 230A, 230B, and 230C may uniquely display one of primary colors. Examples of the primary colors may include the three primary colors of red, green, and blue or yellow, cyan, and magenta. Although not illustrated, the color filters may further include a color filter to display a mixed color of the primary colors or white, in addition to the primary colors. The color filters 230A, 230B, and 230C may be made of an organic material, for example. The respective color filters 230A, 230B, and 230C may extend along the data line 171, and two color filters 230A and 230B and two color filters 230B and 230C adjacent to each other on both sides of the data line 171 may overlap each other.

In accordance with one exemplary embodiment, a plurality of common electrodes 270 are formed over the color filters 230A, 230B, and 230C. The common electrode 270 may be made of a transparent conductive material such as ITO or IZO. The common electrode 270 may be formed, for example, in a plate shape on the entire surface of the substrate 110, and may have an opening 273 disposed in a region of the drain electrode 175. According to one exemplary embodiment, the common electrode 270 may be formed to extend through multiple pixels to form electrical fields with pixel electrodes of those multiple pixels, respectively. For example, the common electrode 270 may extend from a pixel, in which the common electrode 270 is connected to the common voltage line 131, to other pixels where the common electrode 270 is not connected to the common voltage line 131.

In accordance with one exemplary embodiment, the gate insulating layer 140, the first passivation layer 180x, and the color filter 230B may have a first contact hole 184 formed therein so as to expose the extension 133 of the common voltage line 131.

The common electrode 270 may physically and electrically be connected to the common voltage line 131 through the first contact hole 184.

Further, a second passivation layer 180y may be formed over the common electrode 270. The second passivation layer 180y may be made of an organic insulating material or inorganic insulating material.

In accordance with one exemplary embodiment, a pixel electrode 191 may be formed over the second passivation layer 180y. The pixel electrode 191 may include a plurality of first branch electrodes 193, which mainly extend in parallel to each other and are separated from each other, and lower and upper horizontal portions 192 connecting lower and upper end portions of the first branch electrodes 193, respectively. The first branch electrodes 193 of the pixel electrode 191 may be bent along the data line 171. However, in a liquid crystal display according to another exemplary embodiment of the present invention, the data line 171 and the first branch electrodes 193 of the pixel electrode 191 may extend in a straight line. The pixel electrode 191 may be made of a transparent conductive material such as ITO or IZO.

The first passivation layer 180x, the color filters 230A, 230B, and 230C, and the passivation layer 180y may have a plurality of second contact holes 183 to expose part of the drain electrode 175, and the pixel electrode 191 may be electrically connected to the drain electrode 175 through the second contact hole 183 and receive a data voltage.

Further, the second contact hole 183 may be formed at a position corresponding to the opening 273 formed in the common electrode 270.

In accordance with one exemplary embodiment, the pixel electrode 191 receiving a data voltage and the common electrode 270 receiving a common voltage generate an electric field into the liquid crystal layer 3.

Further, the first branch electrode 193 of the pixel electrode 191 may overlap at least part of the common electrode 270 formed in a plane shape.

The lower panel 100 may have a first alignment layer 11 applied on an inner surface thereof.

Now, the upper panel 200 will be described.

A second alignment layer 21 may be applied on an insulation substrate 210.

The first and second alignment layers 11 and 21 may be horizontal alignment layers, for example.

The liquid crystal layer 3 interposed between the lower and upper panels 100 and 200 includes liquid crystal molecules (not illustrated), and the liquid crystal molecules may be aligned in such a manner that the major axes thereof are horizontal with the surfaces of the two panels 100 and 200 in a state where no electrical fields are applied.

A backlight unit (not illustrated) may be formed outside the substrate 110 of the lower panel 100. The backlight unit generates light and provides the generated light to the two panels 100 and 200.

The pixel electrode 191 receiving a data voltage and the common electrode 270 receiving a common voltage generate an electric field into the liquid crystal layer 3 and determine the orientation of the liquid crystal molecules of the liquid crystal layer 3, thereby displaying a corresponding image.

Figure 5:
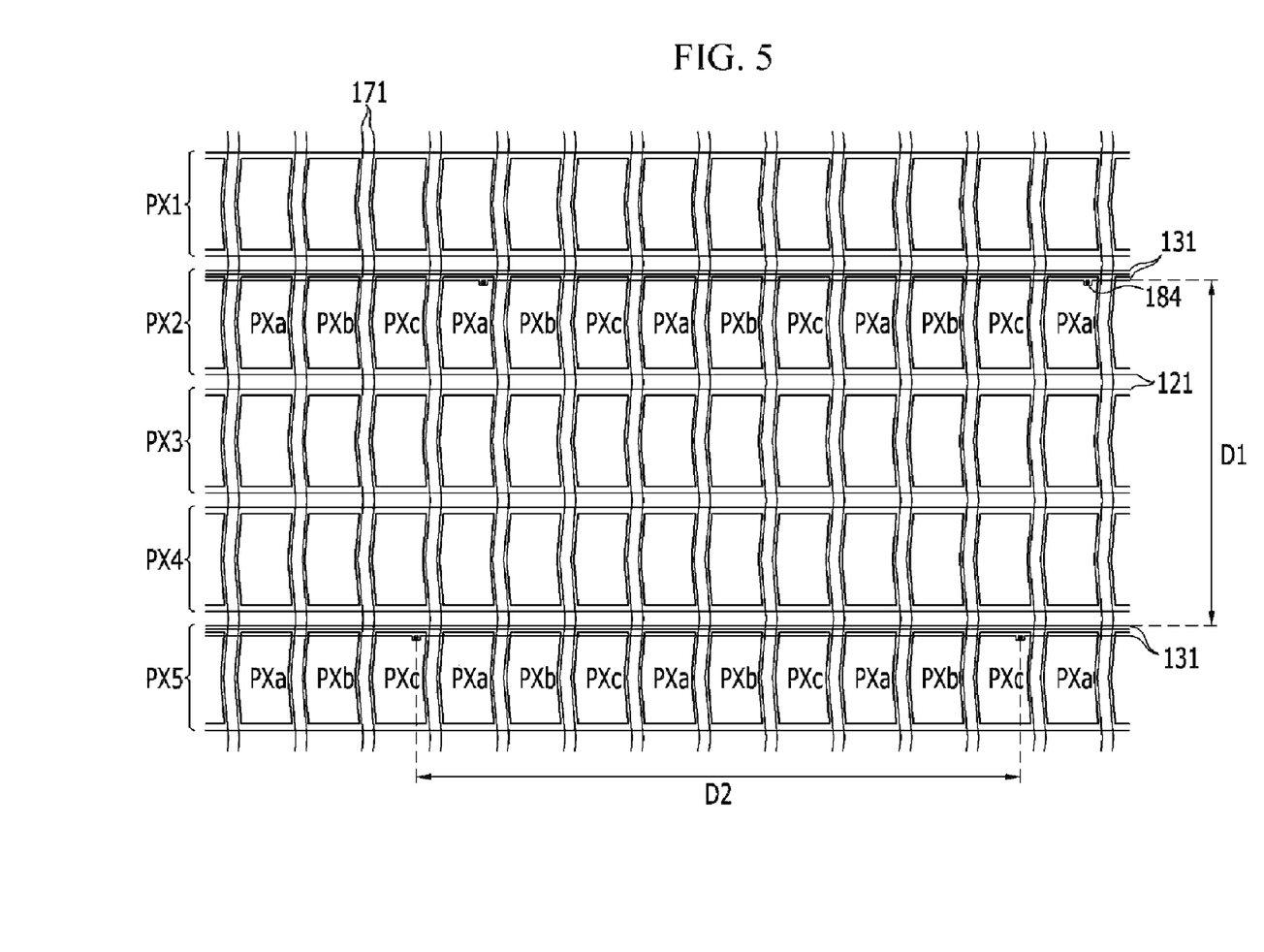
FIG. 5 is a layout view of a plurality of pixel areas of the liquid crystal display according to one exemplary embodiment of the present invention.

Referring now to FIG. 5, a layout of the first contact holes for connecting signal lines, the common voltage lines, and the common electrode of the liquid crystal display according to one exemplary embodiment of the present invention will be described. FIG. 5 is a layout view of a plurality of pixel areas of the liquid crystal display according to one exemplary embodiment of the present invention.

Referring to FIG. 5, a liquid crystal display according to one exemplary embodiment of the present invention may include a plurality of pixels including a first pixel row PX1, a second pixel row PX2, a third pixel row PX3, a fourth pixel row PX4, and a fifth pixel row PX5. The plurality of pixels may include a plurality of first pixels PXa to display a first color, a plurality of second pixels PXb to display a second color, and a plurality of third pixels PXc to display a third color.

The first pixel PXa, the second pixel PXb, and the third pixel PXc, which display different colors, may form one dot.

In accordance with one exemplary embodiment, the common voltage line 131 is formed in the pixel rows PX2 and PX5 among the plurality of pixel rows PX1, PX2, PX3, PX4, and PX5, and may not be formed in the other pixel rows PX1, PX3, and PX4.

A first distance D1 between the common voltage line 131 formed in the second pixel row PX2 and the common voltage line 131 formed in the fifth pixel row PX5 may be set to several centimeters or more, for example the first distance D1 may be in a range of about 0.1 to about 10 cm. In another example, the first distance D1 may be in a range of about 1 to about 5 cm.

FIG. 5 illustrates an embodiment where the common voltage line 131 is formed only in the second and fifth pixel rows PX2 and PX5. However, it is only an example, and one of ordinary skill in the art will appreciate that the common voltage lines 131 may be formed in any suitable pixel rows. The present invention may include all exemplary embodiments in which the first distance D1 between two adjacent common voltage lines 131 is set to any suitable distance, for example, several centimeters or more. As an example, the first distance D1 may be in a range of about 0.1 to about 10 cm. In another example, the first distance D1 may be in a range of about 1 to about 5 cm.

In accordance with one exemplary embodiment, the common voltage line 131 may include a plurality of extensions 133 in which the first contact hole 184 for connection with the common electrode 270 is formed, and a second distance D2 between two adjacent first contact holes 184 may be set to several centimeters or more. For example, the second distance D2 may be in a range of about 0.1 to about 10 cm. In another example, the second distance D2 may be in a range of about 1 to about 5 cm.

In the exemplary embodiment shown in FIG. 5, about nine pixels are included within the second distance D2. However, it is only an example, and the present invention may be applied to all exemplary embodiments in which the second distance D2 between two adjacent first contact holes 184 for connection between the common voltage line 131 and the common electrode 270 is set to any suitable distance, for example, several centimeters or more. For example, the second distance D2 may be in a range of about 0.1 to about 10 cm. In another example, the second distance D2 may be in a range of about 1 to about 5 cm.

In accordance with one exemplary embodiment, the first contact hole 184 exposing the extension 133 of the common voltage line 131 disposed in the second pixel row PX2 is formed in the first pixel PXa, and the first contact hole 184 exposing the extension 133 of the common voltage line 131 disposed in the fifth pixel row PX5 is formed in the third pixel PXc. The first pixel PXa may display a red color, and the third pixel PXc may display a blue color, for example.

In a liquid crystal display according to one exemplary embodiment of the present invention, the distance between two adjacent common voltage lines may be set to several centimeters or more, and the distance between two adjacent contact holes among the contact holes for connection between the common voltage line and the common electrode may be set to several centimeters or more. Thus, it may prevent the reduction in aperture ratio of the liquid crystal display, which may occur due to the formation of the common voltage lines and the contact holes. In accordance with various embodiments of the present disclosure, the connection between the common voltage line and the common electrode can be maintained to reduce the signal delay with the common electrode, while the reduction in aperture ratio of the liquid crystal display is prevented.

Figure 6:
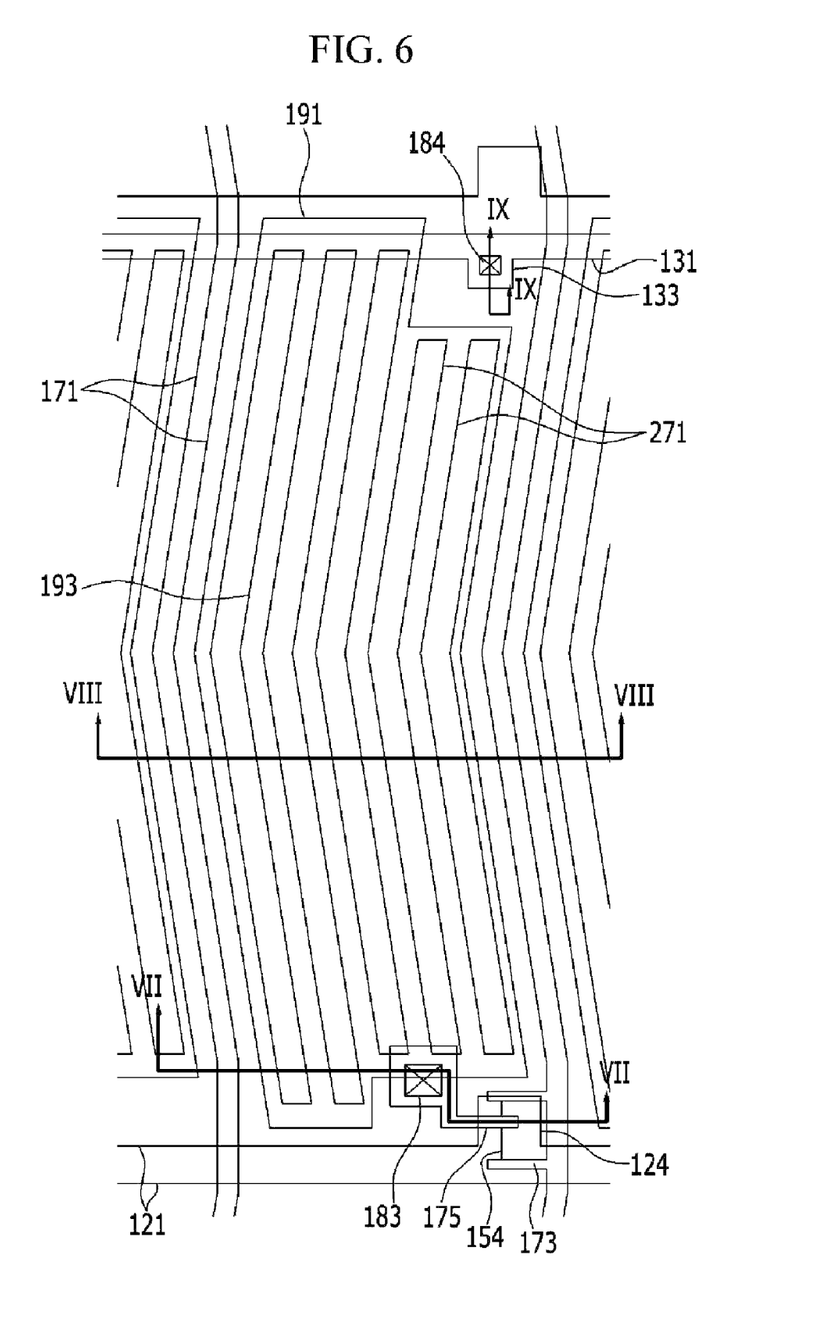
FIG. 6 is a layout view of a liquid crystal display according to one exemplary embodiment of the present invention.
Figure 7:
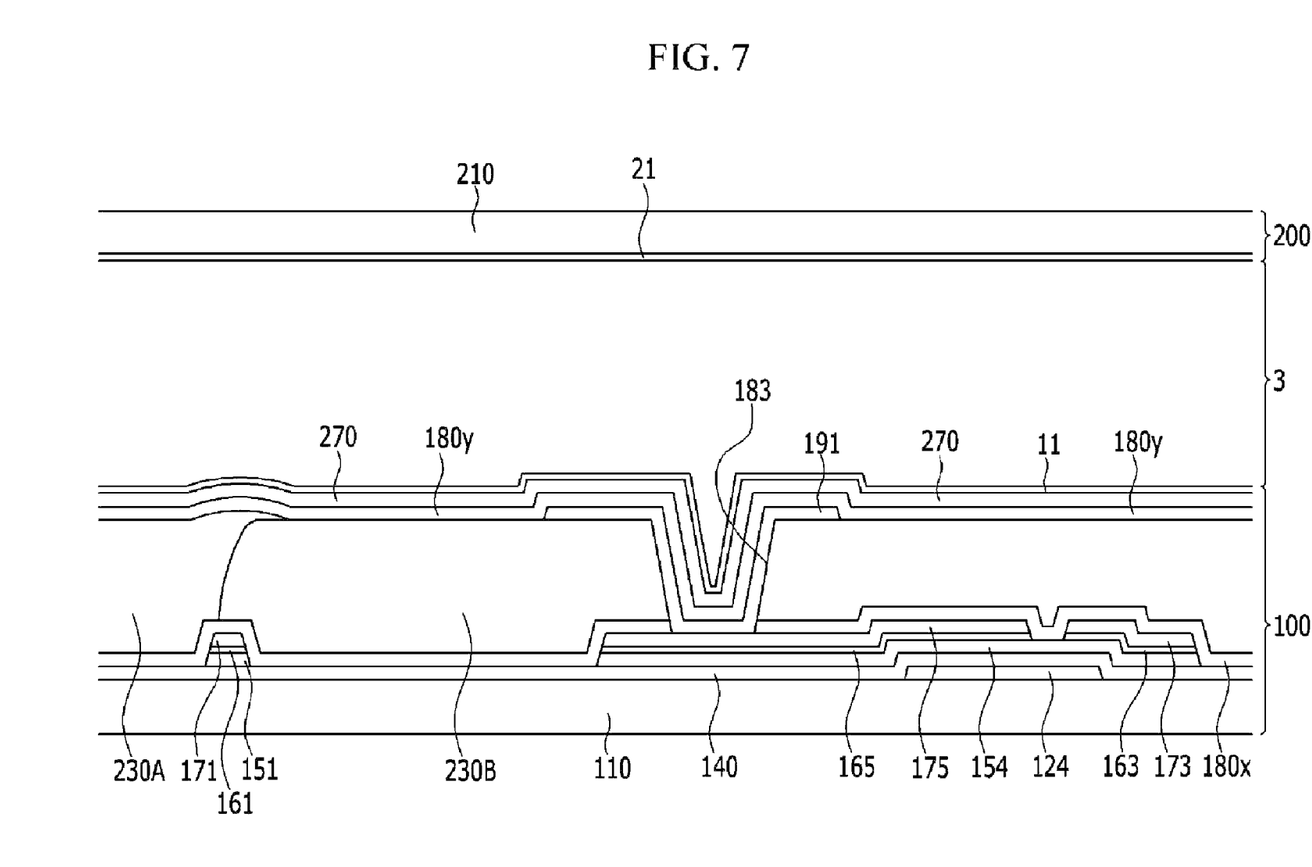
FIG. 7 is a cross-sectional view of the liquid crystal display, taken along line VII-VII of FIG. 6.
Figure 8:
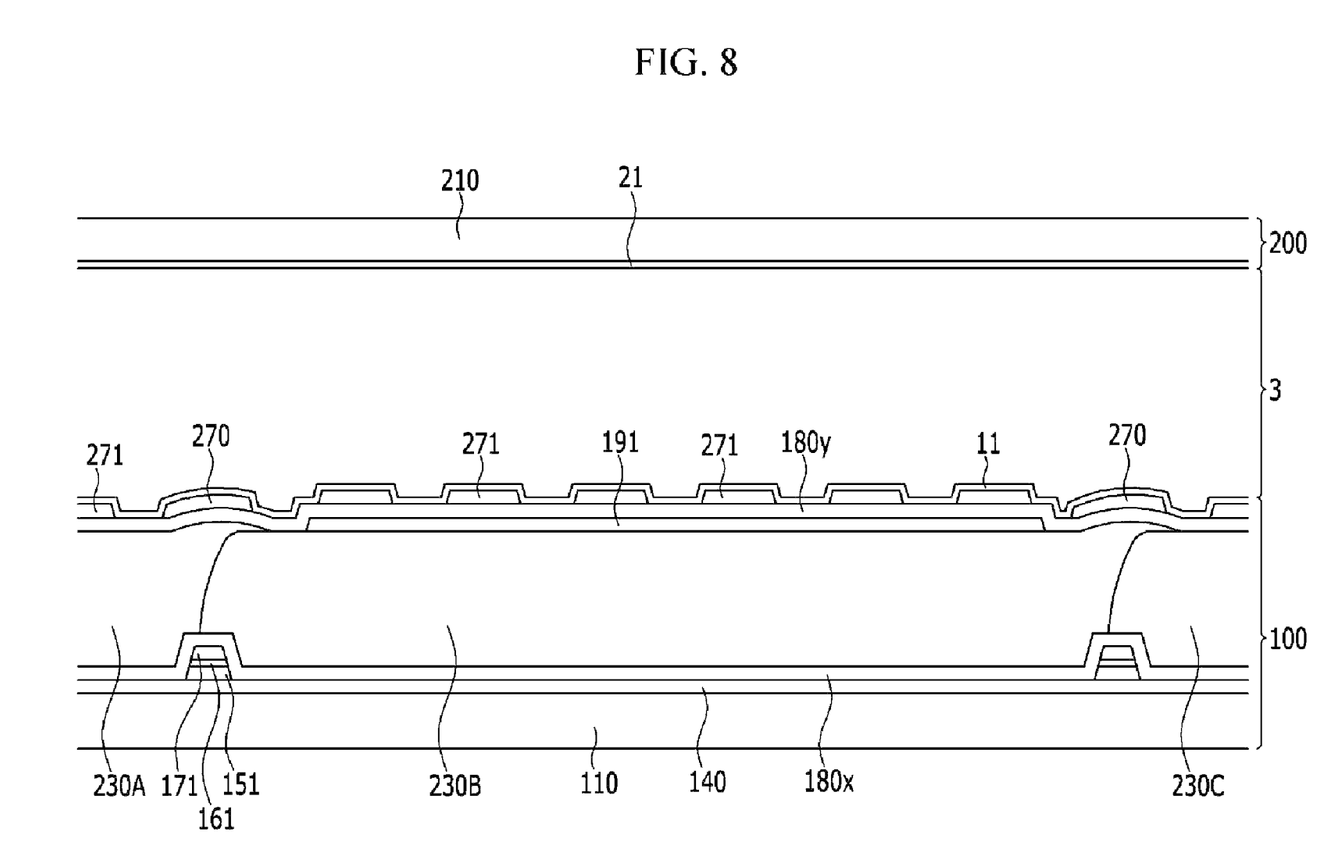
FIG. 8 is a cross-sectional view of the liquid crystal display, taken along line VIII-VIII of FIG. 6.
Figure 9:
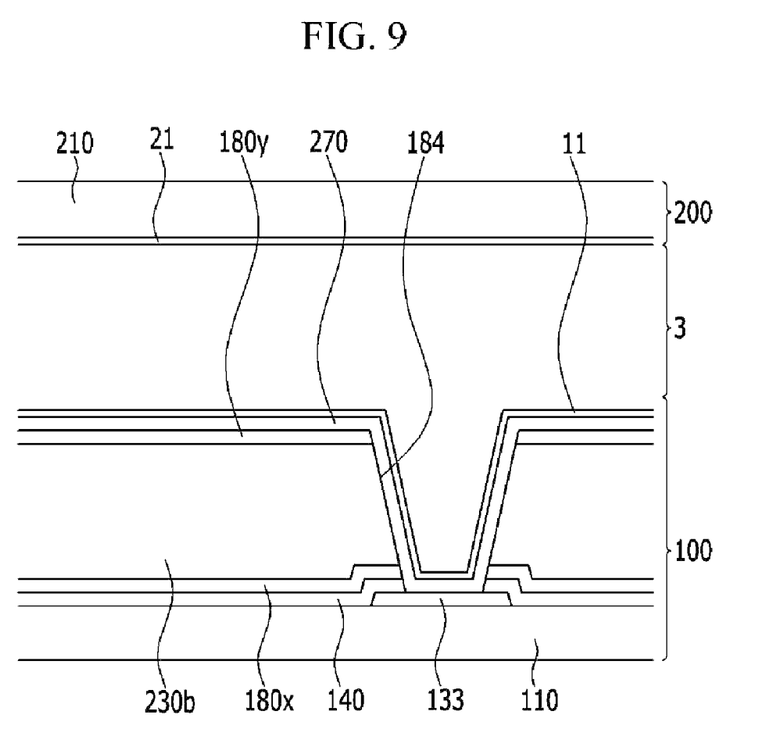
FIG. 9 is a cross-sectional view of the liquid crystal display, taken along line VX-VX of FIG. 6.

Referring now to FIGS. 6 to 9, a liquid crystal display according to one exemplary embodiment of the present invention will be described. FIG. 6 is a layout view of a liquid crystal display according to one exemplary embodiment of the present invention. FIG. 7 is a cross-sectional view of the liquid crystal display, taken along line VII-VII of FIG. 6. FIG. 8 is a cross-sectional view of the liquid crystal display, taken along line VIII-VIII of FIG. 6. FIG. 9 is a cross-sectional view of the liquid crystal display, taken along line VX-VX of FIG. 6.

Referring to FIGS. 6 to 9, the liquid crystal display according to one exemplary embodiment of the present invention includes lower and upper panels 100 and 200 facing each other and a liquid crystal layer 3 positioned between the two panels 100 and 200.

First, the lower panel 100 will be described. In accordance with one exemplary embodiment, a plurality of gate lines 121 including a plurality of gate electrodes 124 and a common voltage line 131 including a plurality of extensions 133 are formed over an insulation substrate 110, and a gate insulating layer 140 is formed over the gate lines 121 and the common voltage line 131. Further, a plurality of semiconductors 151 including a plurality of protrusions 154 may be formed over the gate insulating layer 140, and a plurality of ohmic contacts 161, 163, and 165 are formed over the semiconductors 151 and 154. Data conductors including a plurality of data lines 171 and a plurality of drain electrodes 175 may be formed over the ohmic contacts 161, 163 and 165. The data line 171 may periodically be bent and form an oblique angle with the extension direction of the gate line 121. The oblique angle between the data line 171 and the extension direction of the gate line 121 may be set to 45 degrees or more, for example. However, in a liquid crystal display according to another exemplary embodiment of the present invention, the data line 171 may be extended in a straight line.

In accordance with one exemplary embodiment, a first passivation layer 180x may be positioned over the data conductors 171, 173, and 175 and the exposed semiconductor protrusions 154, and may be made of an organic insulating material or inorganic insulating material.

Further, a plurality of color filters 230A, 230B and 230C may be formed over the first passivation layer 180x. Each of the color filters 230A, 230B, and 230c may uniquely display one of primary colors, and examples of the primary colors may include the three primary colors of red, green, and blue, or yellow, cyan, and magenta. Although not illustrated, the color filters may further include a color filter to display a mixed color of the primary colors or a white color, in addition to the primary colors. The color filters 230A, 230B, and 230C are made of an organic material. The respective color filters 230A, 230B, and 230C may extend along the data line 171, and two color filters 230A and 230B and two color filters 230B and 230C adjacent to each other on both sides of the data line 171 may overlap each other.

In addition, a plurality of pixel electrodes 191 may be formed over the color filters 230A, 230B, and 230C. The pixel electrodes 191 may be formed in a planar shape to occupy most of the area surrounded by the gate line 121 and the data line 171. The pixel electrode 191 as a whole may be formed in a polygonal shape having a side almost parallel to the gate line 121 and the data line 171. The pixel electrode 191 may be made of a transparent conductive material such as ITO or IZO.

A second passivation layer 180y may be formed over the color filters 230A, 230B, and 230C and the pixel electrodes 191. The second passivation layer 180y may include an organic insulator or inorganic insulator.

In accordance with one exemplary embodiment, a common electrode 270 may be formed over the second passivation layer 180y. The common electrode 270 may be made of a transparent conductive material such as ITO or IZO. The common electrodes 270 disposed in adjacent pixels may be connected to each other. The common electrode 270 may also include a plurality of second branch electrodes 271 disposed in each pixel region. The plurality of second branch electrodes 271 may be disposed substantially in parallel to each other, and bent along the data line 171. However, in a liquid crystal display according to another exemplary embodiment of the present invention, the data line 171 and the second branch electrodes 271 of the common electrode 270 may extend in a straight line.

Further, the second branch electrodes 271 of the common electrode 270 may overlap at least part of the pixel electrode 191.

The gate insulating layer 140, the first passivation layer 180x, the color filter 230B, and the second passivation layer 180y have a first contact hole 184 to expose the extension 133 of the common voltage line 131.

The common electrode 270 may be physically and electrically connected to the common voltage line 131 through the first contact hole 184.

The first passivation layer 180x and the color filters 230A, 230B and 230C may have a plurality of second contact holes 183 to expose at least part of the drain electrode 175, and the pixel electrode 191 is electrically connected to the drain electrode 175 through the second contact hole 183 and receives a data voltage.

The pixel electrode 191 receiving a data voltage and the common electrode 270 receiving a common voltage generate an electric field into the liquid crystal layer 3.

In accordance with one exemplary embodiment, the common electrode 270 may cover the plurality of data lines 171 and overlap at least part of the data line 171. Thus, it can contribute to reducing crosstalk between the data line 171 and the pixel electrode 191 and to reducing light leakage caused by parasitic capacitance between the data line 171 and the pixel electrodes 191 adjacent to the data line 171.

The lower panel 100 may have a first alignment layer 11 applied on an inner surface thereof.

Now, the upper panel 200 will be described.

A second alignment layer 21 may be applied on an insulation substrate 210.

The first and second alignment layers 11 and 21 may be horizontal alignment layers, for example.

The liquid crystal layer 3 interposed between the lower panel 100 and the upper panel 200 includes liquid crystal molecules, and the liquid crystal molecules may be aligned in such a manner that the major axes thereof are horizontal with the surfaces of the two panels 100 and 200 in a state where no electric fields are applied.

A backlight unit (not illustrated) may be formed outside the substrate 110 of the lower panel 100. The backlight unit generates light and provides the generated light to the two panels 100 and 200.

The pixel electrode 191 receiving a data voltage and the common electrode 270 receiving a common voltage generate an electric field into the liquid crystal layer 3, and determine the orientation of the liquid crystal molecules of the liquid crystal layer 3, thereby displaying a corresponding image.

As illustrated in FIG. 5, the liquid crystal display according to one exemplary embodiment of the present invention may include a common voltage line formed in some of a plurality of pixel rows.

That is, the common voltage line 131 is formed in some of the plurality of pixel rows, and is not formed in the other pixel rows.

A distance between two adjacent common voltage lines may be set to several centimeters or more.

The common voltage line 131 may include a plurality of extensions 133 disposed under a first contact hole 184 for connection with the common electrode 270, and a second distance D2 between two adjacent first contact holes 184 may be set to several centimeters or more. The first contact hole 184 for connection between the common voltage line 131 and the common electrode 270 may be formed in a pixel to display a red color or blue color among a plurality of pixels forming one dot. For example, the second distance D2 may be in a range of about 0.1 to about 10 cm. In another example, the second distance D2 may be in a range of about 1 to about 5 cm.

In the liquid crystal display according to one exemplary embodiment of the present invention, the distance between two adjacent common voltage lines may be set to several centimeters or more, and the distance between two adjacent contact holes among the contact holes for connection between the common voltage line and the common electrode may be set to several centimeters or more. Thus, it can prevent the reduction in aperture ratio of the liquid crystal display, which may occur due to the formation of the common voltage lines and the contact holes. Thus, the connection between the common voltage line and the common electrode may be maintained to reduce the signal delay with the common electrode, while the reduction in aperture ratio of the liquid crystal display is prevented.

All the features of the liquid crystal display described with reference to FIGS. 1 to 5 may be applied to the liquid crystal display according to the exemplary embodiment shown in FIGS. 6 to 9.

In the above-described exemplary embodiments, it has been described that one of the pixel electrode and the common electrode may have a plate shape, and the other includes a plurality of branch electrodes. However, the present invention is not limited thereto, but may be applied to any other types of liquid crystal displays in which pixel electrodes and common electrodes are formed over one substrate.

Furthermore, in the above-described exemplary embodiments, it has been described that the liquid crystal display may include the pixel electrode and the common electrode which overlap each other with the insulating layer provided therebetween. However, the present invention is not limited thereto, but may be applied to any other types of liquid crystal displays in which pixel electrodes and common electrodes are formed over one substrate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a substrate;
a plurality of common voltage lines disposed on the substrate;
an insulating layer disposed on the common voltage lines; and
a common electrode and a plurality of pixel electrodes disposed on the insulating layer, the plurality of pixel electrodes constituting a plurality of pixels, respectively, wherein the insulating layer comprises a plurality of contact holes to expose at least part of the common voltage lines, and
wherein two adjacent contact holes among the plurality of contact holes are spaced apart by a range of about 0.1 to about 10 centimeters.

2. The liquid crystal display of claim 1, wherein:
a distance between two immediately adjacent common voltage lines among the plurality of common voltage lines is in a range of about 0.1 to about 10 centimeters; and
a distance between two immediately adjacent contact holes in the same row of pixels among the plurality of contact holes is in a range of about 0.1 to about 10 cm.

3. The liquid crystal display of claim 2, wherein:
the plurality of pixels is configured to display different colors; and
the contact holes are formed only in certain ones of the plurality of pixels, and are not formed in pixels other than the certain ones.

4. The liquid crystal display of claim 3, wherein the contact hole is formed in a pixel configured to display a blue color or a red color.

5. The liquid crystal display of claim 3, wherein:
the plurality of pixels is arranged to form a plurality of pixel rows; and
the plurality of common voltage lines is disposed only in certain ones of the plurality of pixel rows, and are not formed in pixel rows other than the certain ones.

6. The liquid crystal display of claim 1, wherein:
the plurality of pixels is configured to display different colors; and
the contact holes are formed only in certain ones of the plurality of pixels, and are not formed in pixels other than the certain ones.

7. The liquid crystal display of claim 6, wherein the contact hole is formed in a pixel configured to display a blue color or a red color.

8. The liquid crystal display of claim 6, wherein:
the plurality of pixels is arranged to form a plurality of pixel rows; and
the plurality of common voltage lines is disposed only in certain ones of the plurality of pixel rows, and are not formed in pixel rows other than the certain ones.

9. The liquid crystal display of claim 1, wherein:
the plurality of pixels is configured to display different colors; and
the contact hole is formed in a pixel configured to display a blue color or red color.

10. The liquid crystal display of claim 1, wherein:
the plurality of pixels is arranged to form a plurality of pixel rows; and
the plurality of common voltage lines is formed in certain ones of the plurality of pixel rows, and are not formed in pixel rows other than the certain ones.

* * * * *